United States Patent
Ahmed et al.

(10) Patent No.: US 7,433,085 B2
(45) Date of Patent: Oct. 7, 2008

(54) INTELLIGENT HARDWARE FOR DETECTING COLOR VALUE OF AN IMAGE

(75) Inventors: Mohamed Nooman Ahmed, Louisville, KY (US); Curt Paul Breswick, Georgetown, KY (US); Gretchen Yvonne Gibson, Lexington, KY (US); Bob Thai Pham, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 1186 days.

(21) Appl. No.: 10/414,530

(22) Filed: Apr. 15, 2003

(65) Prior Publication Data

US 2004/0207882 A1    Oct. 21, 2004

(51) Int. Cl.
    *G06T 5/00*    (2006.01)
(52) U.S. Cl. .................... 358/3.26; 358/3.24; 382/169; 382/167
(58) Field of Classification Search ................. 358/504, 358/506, 515, 516, 520, 522, 1.1–1.9, 1.11–1.18, 358/3.26, 3.24; 345/154, 150; 348/577, 348/599; 382/169, 167, 252, 274
See application file for complete search history.

(56) References Cited

U.S. PATENT DOCUMENTS

| | | | |
|---|---|---|---|
| 5,510,852 A | 4/1996 | Shyu | |
| 5,737,032 A | 4/1998 | Stenzel et al. | |
| 5,841,422 A | 11/1998 | Shyu | |
| 5,987,270 A | 11/1999 | Hulan et al. | |
| 5,990,876 A | 11/1999 | Shyu | |
| 6,178,202 B1 | 1/2001 | Nakaya | |
| 6,243,420 B1 | 6/2001 | Mitchell et al. | |
| 6,271,940 B1* | 8/2001 | Deschuytere et al. | 358/504 |
| 6,323,872 B1 | 11/2001 | Wozniak | |
| 6,486,889 B1 | 11/2002 | Meyers et al. | |
| 6,807,301 B1* | 10/2004 | Tanaka | 382/169 |
| 2001/0002214 A1 | 5/2001 | Yeo et al. | |
| 2001/0017666 A1 | 8/2001 | Sani et al. | |
| 2002/0061063 A1 | 5/2002 | Otto | |

\* cited by examiner

*Primary Examiner*—King Poon
*Assistant Examiner*—Lennin R Rodriguez

(57) ABSTRACT

Pixel characteristics, such as whether a pixel forms part of the background of an image, are evaluated by computing histograms from pixel color space components, by comparing pixel color space components to threshold values, or by other methods.

14 Claims, 3 Drawing Sheets

INTELLIGENT HARDWARE FOR DETECTING COLOR VALUE OF AN IMAGE

BACKGROUND OF THE INVENTION

1. Field of the Invention

The present invention relates generally to image scanning, printing and similar imaging systems in which image processing operations can be performed and, more specifically, to identifying and removing background noise and colors so that the remainder of the image appears cleaner.

2. Description of the Related Art

So-called "multifunction" or "all-in-one" machines that perform some combination of scanning, printing, copying, facsimile and other tasks are increasingly popular for home and business use. A user can place a document in the machine and, for example, press a "Copy" button to cause the machine to scan the document and print a copy.

Scanned images may be categorized into two subgroups, "content" and "background". The content of a document refers to those elements of the image like text or pictures that are intended to be the information of interest to a reader. While the background is made up of everything else that is not content. For example, if black text is printed on yellow paper, the black text is the content while the yellow is the background. Additionally, scanned images inherently contain noise that causes undesirable blemishes in both the content and the background. A document copy consisting of text or pictures (i.e., content only) printed on a pure white background (i.e., a background having no noise) is desirable because it is more readable.

Methods have been developed to remove background colors and noise from a digitized image. Most such methods are based upon histograms. A processor reads the data pixel by pixel and constructs a histogram that reveals the most frequently occurring pixel value. The most frequently occurring pixel value is likely to be that of the background, because the background of a document typically occupies the greatest total area, with the text or pictures occupying a lesser total area. The most frequently occurring pixel value is also likely to be higher than the values of information pixels, because text and pictures are generally printed on white or light-colored backgrounds. Therefore, most background-removal methods simply identify the most frequently occurring pixel, and set to white all pixels having approximately that value or greater. Noise removal methods target the darker pixels of an image, especially in the case of a text document. By making a dark pixel darker (clipping) some noise can be removed.

Background-removal methods can be implemented in hardware or software, but in all-in-one machines, where speed is important to a user, implementing background-removal and other image processing in hardware, such as an application-specific integrated circuit (ASIC), is desirable. An important consideration in ASIC design is minimizing the amount of logic. Therefore, it would be desirable to minimize background-removal logic.

Most all-in-one machines scan documents into RGB color space. Therefore, it would be desirable for a background-removal method to function in this color space or at least be able to accept RGB data as input.

A more general statement of the background removal problem is the problem of determining how colorful a pixel is. If the colorfulness of a pixel can be quantified, the machine can process pixels according to their color. For example, a color background can be removed.

It would be desirable for all-in-one machines and other devices to be able to determine the colorfulness of a pixel and to perform background-removal and other functions based upon the colorfulness determination, a histogram, or both. It would further be desirable for such operations to be implemented efficiently in ASIC hardware. The present invention addresses these problems and others in the manner described below.

SUMMARY OF THE INVENTION

The present invention relates to evaluating pixel characteristics by, for example, computing histograms from pixel color space components or comparing pixel color space components to threshold values, using minimal hardware logic. Hardware logic can be economized by, for example, using bit-shift operations to approximate the conversion of pixels from one color space to another, such as from RGB color space to YCrCb color space. For example, an approximation of luminance (Y) can be computed by summing a red component (R) of the pixel shifted right two bits, a green component (G) of the pixel shifted right by one bit, and a blue component (B) of the pixel shifted right two bits. Similar bit shift operations can be used to approximate the Cr and Cb components from the approximation of Y and the R, G and B components.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1A:
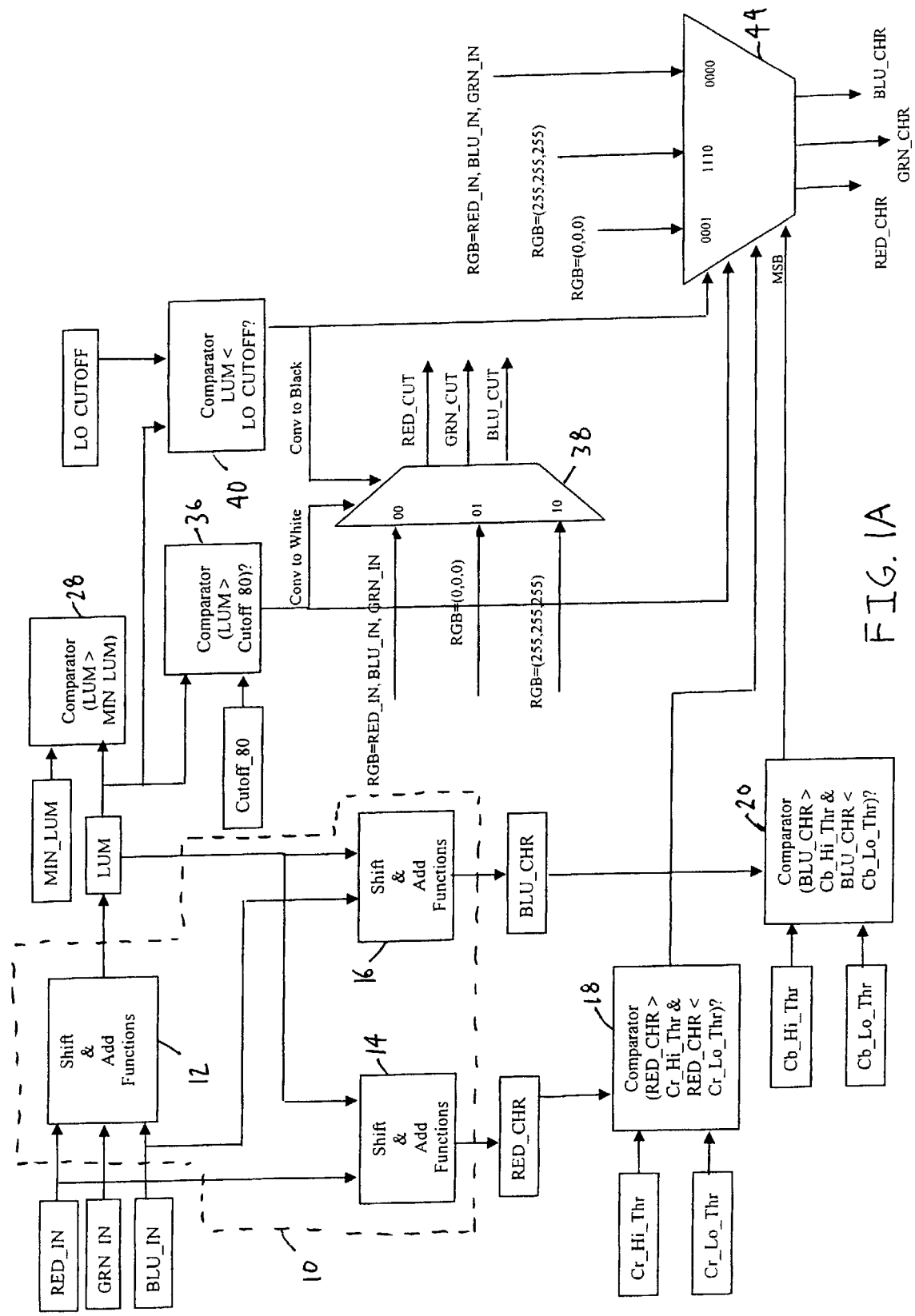
FIG. 1A is a block diagram of a pixel color evaluation system that removes a background from an image and stretches the remaining pixels.
Figure 1B:
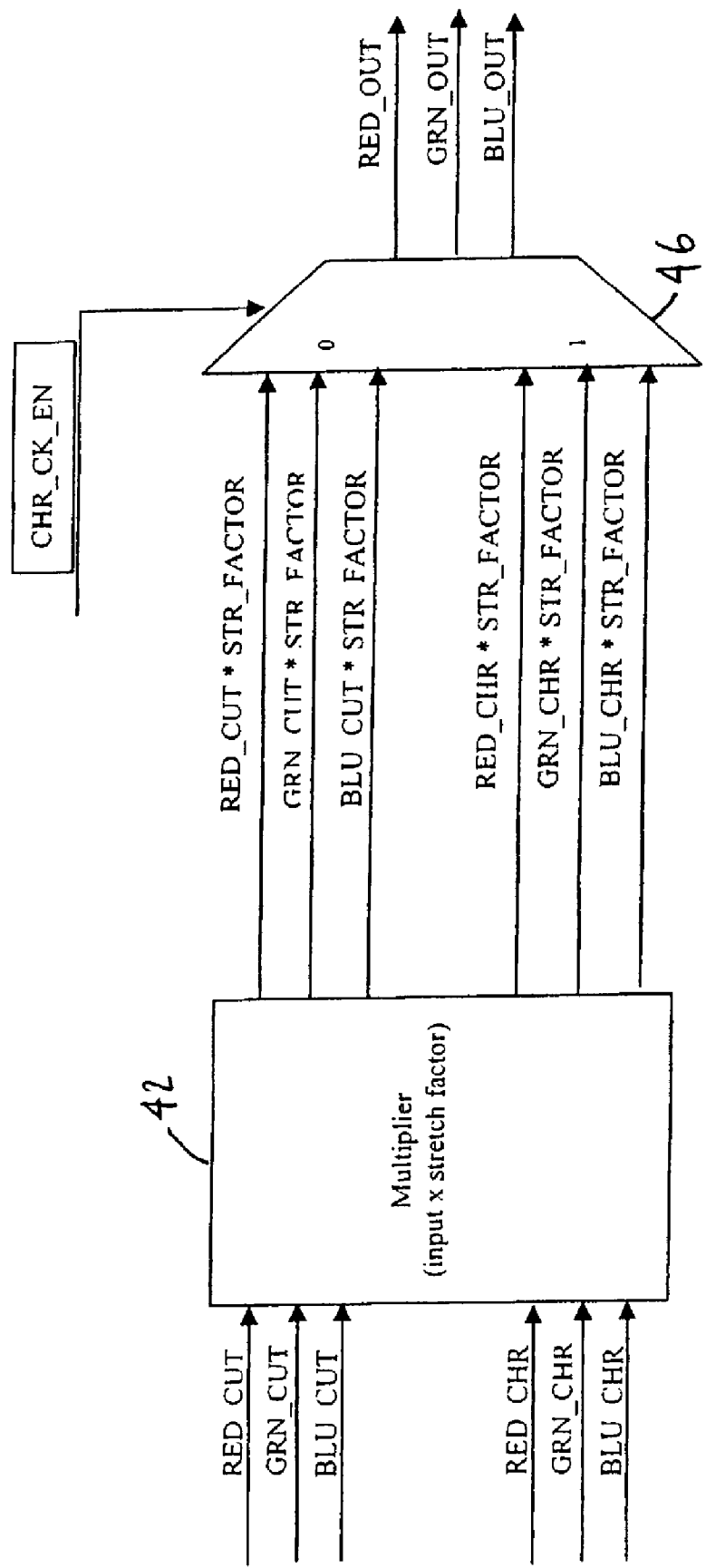
FIG. 1B is a continuation of FIG. 1A.

Logic elements of an application-specific integrated circuit (ASIC) or similar hardware or firmware device relating to color space conversion, pixel characteristic evaluation, and image background removal are illustrated in FIG. 1. In an exemplary embodiment of the invention, the ASIC is included in an all-in-one machine (not shown) that performs some combination of scanning, printing, copying and other document processing tasks. As described below, features of the invention serve to minimize the amount of ASIC resources used for color space conversion, pixel characteristic evaluation, and image background removal operations in the device. In the exemplary embodiment, a pixel characteristic can be, for example, whether a pixel forms part of the background of the image. Pixels can be evaluated by generating a histogram, by comparing color space components of the pixel to predetermined threshold values or other quantities, or by other suitable means. The results of the evaluation can be used to remove a background or perform other processing on the image.

As well-understood by persons skilled in the art to which the invention relates, the image data can be acquired and stored in a main memory (not shown) by, for example, a user causing the machine to scan a document. For example, the user can place the document in the machine and press a "Copy" button, which causes the machine to scan the document, store the resulting image data, and then print the stored data. Aspects of the all-in-one machine not relating to color conversion and pixel characteristic evaluation are not described in this patent specification because such machines are well-understood by persons skilled in the art.

Color space conversion logic 10 converts pixels from RGB color space to YCrCb color space. According to the ITU-R BT.601 standard (formerly CCIR601), the following matrix equation is used to convert from RGB to YCbCr color space:

$$\begin{bmatrix} Y \\ Cr \\ Cb \end{bmatrix} = \begin{bmatrix} 0.299 & 0.587 & 0.114 \\ 0.500 & -0.419 & -0.081 \\ -0.169 & -0.331 & 0.500 \end{bmatrix} \begin{bmatrix} R \\ G \\ B \end{bmatrix}$$

Also according to the ITU-R BT.601 standard (formerly CCIR601), the following equation is used to calculate luminance (Y) component of a pixel represented in RGB color space:

$$Y=0.299R+0.587G+0.114B$$

The ASIC logic approximates this equation in shift-and-add logic 12 with the following operations upon the RGB pixel data, where the symbol ">>n" represents a binary right-shift by n bits operation that is equivalent to dividing by $2^n$:

$$Y=(R>>2)+(G>>1)+(B>>2)$$

By performing straightforward bit-shifting and addition operations in the ASIC instead of more computationally intensive and hardware-intensive matrix multiplication, the number of logic gates required is minimized and processing speed maximized.

The Cr and Cb components of the pixel can be similarly approximated. From the matrix equation above, G and B can be defined as a function of Y and then substituted into the luminance (Y) approximation above:

$$Cr=0.71875R-0.71875Y$$

$$0.71875R=0.5R+0.25R-0.03125R=(R>>1)+(R>>2)-(R>>5)$$

$$0.71875Y=0.5Y+0.25Y-0.03125Y=(Y>>1)+(Y>>2)-(Y>>5)$$

$$Cr=(R>>1)+(R>>2)-(R>>5)-((Y>>1)+(Y>>2)-(Y>>5))$$

$$Cb=0.5625B-0.5625Y$$

$$0.5625B=0.5B+0.0625B=(B>>1)+(B>>4)$$

$$0.5625Y=0.5Y+0.0625Y=(Y>>1)+(Y>>4)$$

$$Cb=(B>>1)+(B>>4)-((Y>>1)+(Y>>4))$$

These approximated Cr and Cb equations can be readily implemented with shift-and-add logic 14 and 16, respectively. Once a pixel has been converted from RGB color space to YCrCb color space, other ASIC logic can evaluate characteristics of the pixel using the Y, Cr and Cb components in any suitable manner. For example, as described below, the Y, Cr and Cb components can be compared with programmable threshold values, or one or more of them can be used to construct a histogram.

As shown in FIG. 1, comparator logic 18 compares the approximated Cr component (RED_CHR) with predetermined (programmable) upper and lower thresholds (Cr_Hi_Thr and Cr_Lo_Thr, respectively). Similarly, comparator logic 20 compares the approximated Cb component (BLU_CHR) with predetermined (programmable) upper and lower thresholds (Cb_Hi_Thr and Cb_Lo_Thr, respectively). Any suitable action can be initiated in response to these comparisons, such as the background removal operation described below.

Figure 2:
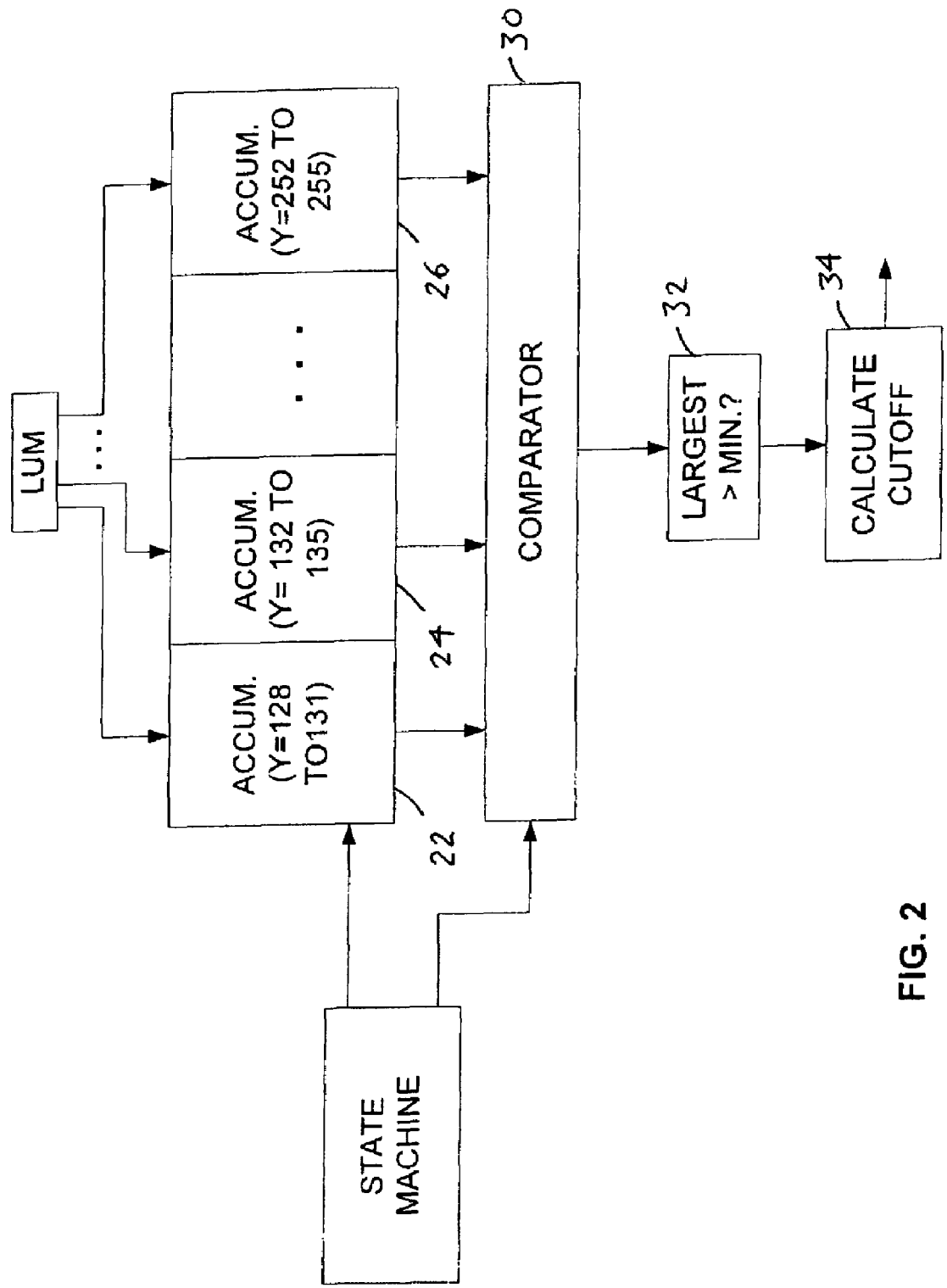
FIG. 2 is a block diagram of a luminance histogram generator.

The approximated Y component (LUM) can be used not only as an input to shift-and-add logic 14 and 16 for computing the approximated Cr and Cb components, but also as an input to the histogram logic illustrated in FIG. 2 for performing background removal. As illustrated in FIG. 2, there are 32 accumulators 22, 24, 26, etc., each of which is sensitive to four luminance values. For example, the first accumulator 22 counts the number of pixels in the image or a selected sample thereof having luminance values in the range of 128-131; the second accumulator 24 counts the number of pixels in the image or sample thereof having luminance values in the range of 132-135; and so on, with the last accumulator counting the number of pixels having luminance values in the range of 252-255. (In the exemplary embodiment, the luminance component has eight bits, and the maximum pixel luminance value is thus 255.) Referring briefly again to FIG. 1, however, it should be noted that a comparator 28 allows an accumulator 22, 24, 26, etc. to count or accumulate only if the luminance value exceeds some predetermined minimum (MIN_LUM). This grouping of four luminance values per accumulator serves to minimize the amount of hardware logic, and represents a four-fold reduction over conventional histogram generators implemented in hardware. Returning to FIG. 2, a comparator 30 determines which of accumulators 22, 24, 26, etc. has the highest count or sum after all pixels in the image or sample thereof have been received. The sample size can be a programmable value in the range of 1-32 lines of image data. Another comparator 32 filters out any accumulator sum that does not exceed some predetermined minimum threshold. In other words, an accumulator 22, 24, 26, etc., can only be considered to represent the peak luminance if its count exceeds the threshold. If a count is highest but does not exceed the threshold, then there is no luminance value that can be considered to represent a background color. A cutoff value that is some suitable predetermined percentage of this peak, such as 80 percent, is computed by logic 34.

Returning to FIG. 1, a comparator 36 compares the approximated luminance (LUM) with the cutoff value (Cutoff _80). If the approximated luminance is greater than the cutoff value, comparator 36 signals a selector 38 that the pixel is to be converted to white because it is deemed to form part of the background of the image. Another comparator 40 compares the approximated luminance with a predetermined lower threshold (LO_CUTOFF). If the approximated luminance is lower than the lower threshold, comparator 36 signals a selector 38 that the pixel is to be converted to black because it is deemed to be dark enough to be considered black and should be clipped. Note that as white is represented by an RGB value of (255, 255, 255) black is represented by an RGB value of (0, 0, 0). Selector 38 selects the appropriate one of its inputs as its output: R,G and B components set to values of 255, 255 and 255, respectively (i.e., a white pixel); R,G and B components set to values of 0, 0 and 0, respectively (i.e., a black pixel); or R,G and B components left unchanged at their original values in the received pixel. The output pixel components (RED_CUT, GRN_CUT and BLU_CUT) are provided to a multiplier 42 that stretches the pixels, i.e., spreads the pixel population across the entire luminance range, as described below.

Another selector 44 receives as its selection signals the signal from comparator 40 to convert the pixel to black and the signals from comparators 18 and 20 relating to the comparison of the approximated Cr and Cb values with threshold levels. In response to the values of these signals as indicated in the diagram of FIG. 3, selector 44 selects the appropriate one of its inputs as its output: R,G and B components set to values of 255, 255 and 255, respectively (i.e., a white pixel); R,G and B components set to values of 0, 0 and 0, respectively (i.e., a black pixel); or R,G and B components left unchanged at their original values in the received pixel. The output pixel components (RED_CHR, GRN_CHR and BLU_CHR) are provided to multiplier 42.

Multiplier 42 multiplies each of RED_CHR, GRN_CHR and BLU_CHR by a predetermined stretch factor defined by 255/Cutoff, where Cutoff is the above-described predetermined percentage of the peak accumulator value, and also multiplies each of RED_CUT, GRN_CUT and BLU_CUT by the stretch factor. (Note that to minimize hardware, the stretch factor can be represented by a stretch numerator divided by 128, with the division by 128 being performed by bit-shifting. Therefore, all that is required in hardware to perform pixel stretching is multiplier 42.) A selector 46 selects the results of the former multiplication as its output if chromaticity checking is enabled, i.e., has been selected by the machine software or firmware, and selects the results of the latter multiplication as its output if chromaticity checking is not enabled. The output of selector 46 represents the pixels that form the image following background removal and pixel color conversion. Note that chromaticity checking is thus an option that can be present or not present in a given commercial embodiment of the all-in-one machine. Alternatively, chromaticity checking can be made actively selectable (i.e., enabled or disabled by firmware or other process control) during machine operation in response to predetermined conditions, such as a user-input selection or detection of the type of document being processed (e.g., text-only, business graphics, text-with-photo, etc.).

Also note that pixel stretching and clipping can be options that can be present or not present, alone or in any combination, in a given commercial embodiment of the machine or other embodiment of the invention. Pixels can be clipped to black or to white, as described above. For example, one commercial embodiment of the machine could clip to white all pixels above an upper luminance threshold (e.g., Cutoff), clip to black all pixels below a lower threshold (e.g., LO_CUTOFF), and stretch all pixels between these thresholds. Another commercial embodiment of the machine could clip to white all pixels above the upper threshold and stretch all pixels below the upper threshold, without clipping any pixels to black. Yet another commercial embodiment could clip pixels to white, clip others to black, and not stretch in between. Still other combinations of stretching or not stretching, clipping to white or not clipping to white, and clipping to black or not clipping to black, are possible in other commercial embodiments of the machine. Alternatively, one or more of these options can be made actively selectable (i.e., enabled or disabled by firmware or other process control during machine operation) in response to predetermined conditions, such as a user-input selection or detection of the type of document being processed. More generally, any of the features of the invention described above, can be present, not present, or actively selectable, in any suitable combination, in any given embodiment of the invention.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing color pixel data of an image, comprising the steps of:

computing in hardware logic using bit-shift operations an approximation of at least one of a plurality of other color space components of a pixel represented in RGB color space, wherein the at least one other color space component includes luminance, and an approximation of luminance (Y) is computed by summing a red component (R) of the pixel shifted right two bits, a green component (G) of the pixel shifted fight by one bit, and a blue component (B) of the pixel shifted right two bits; and evaluating a characteristic of the pixel in response to the computed approximation of the at least one of the plurality of other color space components.

2. The method claimed in claim 1, wherein the step of evaluating a characteristic of the pixel comprises computing a histogram from one of the computed other color space components of the pixels.

3. The method claimed in claim 2, wherein the step of computing a histogram comprises the steps of:

defining a plurality of luminance intervals each spanning a plurality of luminance values;

determining a frequency of occurrence of pixels in the image having a luminance within each luminance interval;

identifying a luminance interval with the highest frequency of occurrence; and performing an image processing method on pixels of the image having a luminance related by a predetermined relation to a luminance value in the identified luminance interval.

4. The method claimed in claim 3, wherein:

the predetermined relation is that pixels on which the image processing method is performed have a luminance greater than a cutoff value (Cutoff) that is a predetermined percentage of the luminance value in the identified luminance interval; and the image processing method is background-removal and comprises the step of setting to a predetermined maximum or white value the red, green and blue components of each pixel in the image having a luminance greater than or equal to Cutoff.

5. The method claimed in claim 4, wherein the predetermined percentage is approximately 80%.

6. The method claimed in claim 4, wherein the background-removal method further comprises the step of expanding the red, green and blue components of each pixel in the image having a luminance value less than Cutoff.

7. The method claimed in claim 6, wherein expanding the red, green and blue components of each pixel comprises the step of multiplying each of the red, green and blue components by 255 and dividing by Cutoff.

8. The method claimed in claim 1, wherein the step of evaluating a characteristic of the pixel comprises comparing at least one of the computed other color space components of the pixels to a predetermined threshold value.

9. The method claimed in claim 8, wherein computing at least one of a plurality of other color space components of a pixel represented in RGB color space further comprises the steps of:
    computing an approximation of chrominance component Cr of the pixel by computing ((R>>1)+(R>>2)−(R>>5))−((Y>>1)+(Y>>2)−(Y>>5)), wherein "X>>n" represents shifting RGB color space component X by n bits to the right; and
    computing an approximation of chrominance component Cb of the pixel by computing ((B>>1)+(B>>4))−((Y>>1)+(Y>>4)).

10. The method claimed in claim 9, wherein comparing at least one of the computed other color space components of the pixels to a predetermined threshold value comprises the steps of:
    determining whether the computed approximation of Cr is less than a predetermined Cr upper threshold;
    determining whether the computed approximation of Cr is greater than a predetermined Cr lower threshold;
    determining whether the computed approximation of Cb is less than a predetermined Cb upper threshold;
    determining whether the computed approximation of Cb is greater than a predetermined Cb lower threshold;
    determining whether the computed approximation of Y is greater than a predetermined Y cutoff; and
    determining whether the computed approximation of Y is less than a predetermined Y lower threshold.

11. The method claimed in claim 10, wherein evaluating a characteristic of the pixel further comprises the steps of:
    setting the pixel to white if the computed approximation of Cr is less than the predetermined Cr upper threshold, and the computed approximation of Cr is greater than the predetermined Cr lower threshold, and the computed approximation of Cb is less than the predetermined Cb upper threshold, and the computed approximation of Cb is greater than the predetermined Cb lower threshold, and the computed approximation of Y is greater than the predetermined Y cutoff; and
    setting the pixel to black if the computed approximation of Cr is not less than the predetermined Cr upper threshold, or the computed approximation of Cr is not greater than the predetermined Cr lower threshold, or the computed approximation of Cb is not less than the predetermined Cb upper threshold, or the computed approximation of Cb is not greater than the predetermined Cb lower threshold, or the computed approximation of Y is not greater than the predetermined Y cutoff, and if the computed approximation of Y is less than the predetermined Y lower threshold.

12. A system for processing color pixel data of an image, comprising:
    color space converter logic having bit-shift logic producing approximations of YCbCr color space components of a pixel represented in RGB color space; and
    a histogram generator producing a histogram from one of the computed other color space components of the pixels, wherein the histogram generator comprises:
        a plurality of accumulators, each defining exactly one luminance interval spanning a plurality of luminance values;
        first comparator logic determining a frequency of occurrence of pixels in the image having a luminance within each luminance interval;
        second comparator logic identifying a luminance interval with the highest frequency of occurrence; and
        background removal logic identifying and setting to a predetermined maximum or white value the red, green and blue components of each pixel in the image having a luminance greater than or equal to a cutoff value (Cutoff) that is a predetermined percentage of the luminance value in the identified luminance interval, wherein the predetermined percentage is approximately 80%.

13. A system for processing color pixel data of an image, comprising:
    color space converter logic having bit-shift logic producing approximations of YCbCr color space components of a pixel represented in RGB color space; and
    a histogram generator producing a histogram from one of the computed other color space components of the pixels, wherein the histogram generator comprises:
        a plurality of accumulators, each defining exactly one luminance interval spanning a plurality of luminance values;
        first comparator logic determining a frequency of occurrence of pixels in the image having a luminance within each luminance interval;
        second comparator logic identifying a luminance interval with the highest frequency of occurrence;
        background removal logic identifying and setting to a predetermined maximum or white value the red, green and blue components of each pixel in the image having a luminance greater than or equal to a cutoff value (Cutoff) that is a predetermined percentage of the luminance value in the identified luminance interval; and
        pixel expansion logic expanding the red, green and blue components of each pixel in the image having a luminance value less than Cutoff.

14. The system claimed in claim 13, wherein the pixel expansion logic multiplies each of the red, green and blue components by 255 and divides by Cutoff.

* * * * *